May 3, 1927.
J. S. PECKER
DENTIST'S ANVIL
Filed March 10, 1924
1,626,754
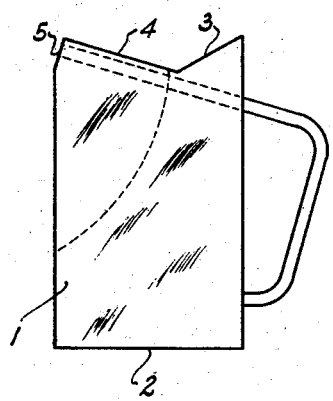
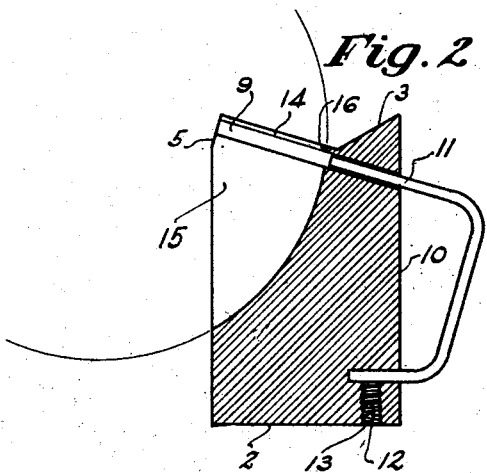
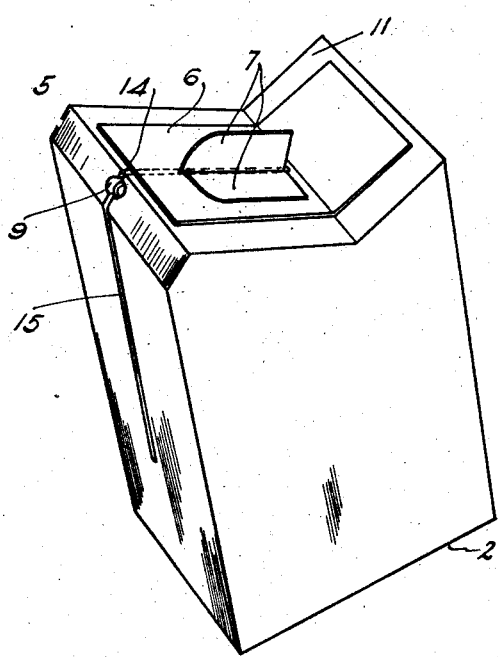
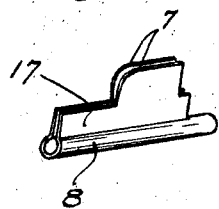
Inventor
JOSEPH S. PECKER.
By
Attorney Patented May 3, 1927.

1,626,754

UNITED STATES PATENT OFFICE.

JOSEPH S. PECKER, OF PHILADELPHIA, PENNSYLVANIA, ASSIGNOR, BY MESNE ASSIGNMENTS, TO DIXIE DENTAL MANUFACTURING CO., OF PHILADELPHIA, PENNSYLVANIA, A CORPORATION OF PENNSYLVANIA.

DENTIST'S ANVIL.

Application filed March 10, 1924. Serial No. 698,179.

My invention relates to a dentist's anvil for the making of backings used to interchangeably mount artificial teeth in crown and bridge work.

It has long been the practice to provide interchangeable facings having an undercut slot opening through a lingual surface of the facing, and a backing plate carrying a shouldered pin adapted to fit into said slot, after which the backing was cemented to the lingual surface of the facing.

Anvils have been heretofore designed for the manufacture of flat backings adapted for the interchangeable mounting of the facings above described. There has now come on the market an interchangeable root facing which differs from the previous facings in having an enlarged root extension at its gingival end which provides an angled seat for the backing.

The primary object of my present invention is to perfect a dentist's anvil adapted for the production of angled backings carrying pins for interchangeably mounting root facings.

A further object of my invention is to perfect dentist's anvils for the production of all types of backings, and the special features of novelty consist in the provision of the pin hole with a bottom slot to make it self clearing of any matter that may become lodged therein; the cutting of this slot by a saw or milling tool adapted in cutting the slot to leave the inner end wall of the upper slot so shaped that the web of the pin will fit snugly against and close the inner end of the slot, thereby avoiding the difficult and expensive work now required in facing up this end wall of the slot; the provision of an ejector carried by the anvil and adapted to positively eject the pin after attachment to the backing plate from the anvil; and finally the facing off of the forward corner of the anvil to present a face at right angles to the pin hole, thereby facilitating the easy and accurate drilling of said hole.

My invention also comprises the novel details of construction and arrangements of parts, which in their preferred construction only are illustrated in the accompanying drawings which form a part of this specification, and in which:—

Fig. 1 is a side view of the anvil.

Fig. 2 is a vertical cross-sectional view taken in the plane of the pin slot, the curved line showing the travel of the milling tool used to cut the slots and face up the end wall thereof in one operation.

Fig. 3 is a perspective view enlarged of the anvil showing a backing formed thereon and having one of the pin flanges swaged down against the plate, the other being shown upright in a position in which it is inserted through a hole provided therefor in the backing plate.

Fig. 4 is a detail perspective view of a pin suitable for use with the anvil.

Similar reference numerals refer to similar parts throughout the drawings.

In the embodiment of my invention illustrated, the anvil is formed of rectangular block of steel 1 having a flat bottom face 2, and having an angled top comprising three faces 3, 4 and 5. The faces 3 and 4 are the work faces and they are shown disposed at an angle corresponding to the angle between the cusp seats formed on the lingual faces of the root facing. I show a backing plate 6 which is provided with a hole adapted to receive the flanges 7 of the pin 8 and which has been shaped to the angle of the anvil faces 3 and 4. I drill at right angles to the anvil face 5, and parallel with the face 4, a hole 9 having a diameter to adapt it to receive with a very close snug fit the pin 8. This hole extends through the back wall 10 of the anvil and is adapted to receive the upper end of an ejector 11 formed by a piece of bent wire, the lower end of which is inserted in a hole near the bottom of the wall 10 and locked therein by a set screw 12 which is screwed up through a threaded opening 13 in the anvil bottom 2. The vertical member of the ejector is disposed at an angle to the back face 10 and has sufficient spring to permit it to be forced towards said face and to project its free ejector end 11 far enough through the hole 9 to engage and eject the pin 8, thus facilitating the removal of the assembled backing from the anvil. The flanges 7 of the pin 8 rise from side walls 17 which project through a top slot 14 leading from the pin hole 9 upwardly through the face 4 and the upper edges of these walls stand flush with the surface 4. The slot 14 stops short of the base of the face 3. Below, and in line with this upper slot 14, is a bottom slot 15 which is provided to make the pin hole 9 self clearing and to permit the use of a saw or milling tool to cut the slots 14 and 15 in one operation, it being observed that the axis of the saw is placed in line with or below the plane of the face. This is important because the saw when thus placed will cut away the end wall 16 of the slot 14 so that it stands approximately at right angles to the face 4. In fact the drawings show the wall slightly undercut and the importance of this feature is that no treatment of the end wall 16 of the slot is required to enable the walls 17 of the pin to fit snugly against it, thus filling out the slot 14 in the face 4. If the pin walls 17 were held away from the upper edge of the wall 16 by a contact with the lower edge of said wall a slight portion of the slot 14 would be left unclosed and when the plate is hammered down on the anvil it would be defaced by entering that uncovered part of the slot and the requisite smooth tooth engaging surface would not result.

In operation, a pin 8 is placed in the anvil and a backing plate having the requisite outside dimensions and center hole for the pin flanges is mounted on the anvil and shaped to fit against its faces 3 and 4 in the manner well understood in this art. The pin flanges are caused to project through the backing plate hole and are then swaged over and soldered to the plate. If the complete backing will not slide off readily from the anvil the ejector 11 is pressed or struck and the assembled backing is driven out by the engagement of the ejector 11 with the pin which carries with it the backing plate without deforming the latter.

By the use of my invention the dentist can prepare in his own laboratory the backings for his crown and bridge work, buying only the root facing and the standard pins, and this will greatly facilitate the extension of the use of root facings throughout the profession.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. An anvil having a downwardly inclined work face, an upwardly inclined work face at the inner end of the first mentioned work face, and a downwardly inclined drilled face at the outer end of the first mentioned work face and disposed at right angles thereto, there being a pin hole drilled at right angles to said drilled face through the anvil with its axis parallel with the first mentioned work face, and a slot connecting the pin hole with the downwardly inclined work face and extending from the drilled face substantially to the upwardly inclined work face.

2. A dentist's anvil having a work surface, there being a pin hole drilled through the anvil with its axis parallel with the work surface and having a slot connecting it with said surface, and an ejector carried by the anvil and movable through the back end of said pin hole, as and for the purposes described.

3. A dentist's anvil having a pin hole drilled therethrough with its axis parallel with the anvil's work face, there being a slot milled through a corner of the anvil in a plane vertical to the work face which bisects said hole and defines a circular cut which leaves the inner end wall of the slot disposed substantially at right angles to the work face of the anvil.

In testimony whereof I affix my signature.

JOSEPH S. PECKER.